March 5, 1929.  W. R. JOHNSTON  1,704,615
AUTOMATIC HEADLIGHT MECHANISM
Filed April 12, 1928  2 Sheets-Sheet 1
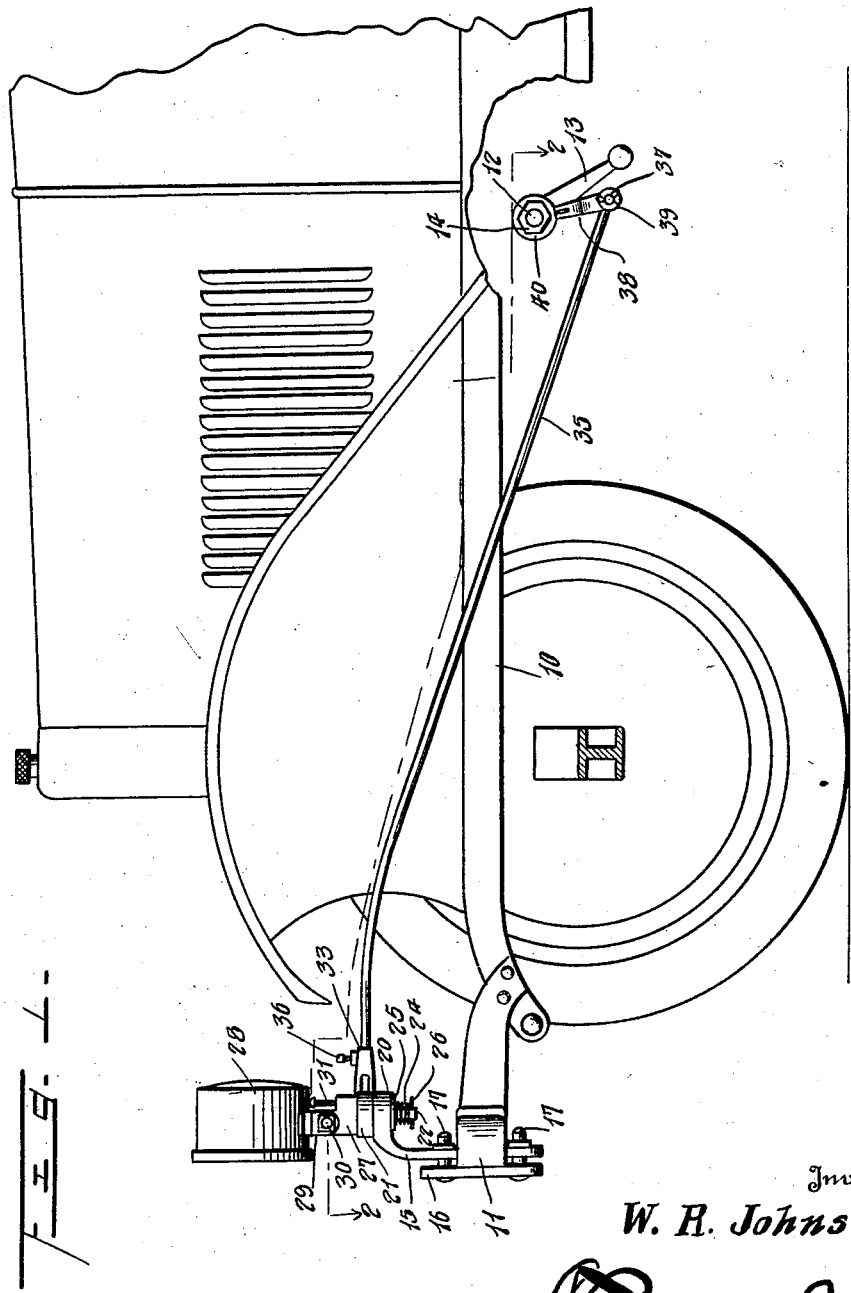
Inventor
W. R. Johnston,
By A. Randulph Jr.
Attorney March 5, 1929.  W. R. JOHNSTON  1,704,615
AUTOMATIC HEADLIGHT MECHANISM
Filed April 12, 1928   2 Sheets-Sheet 2
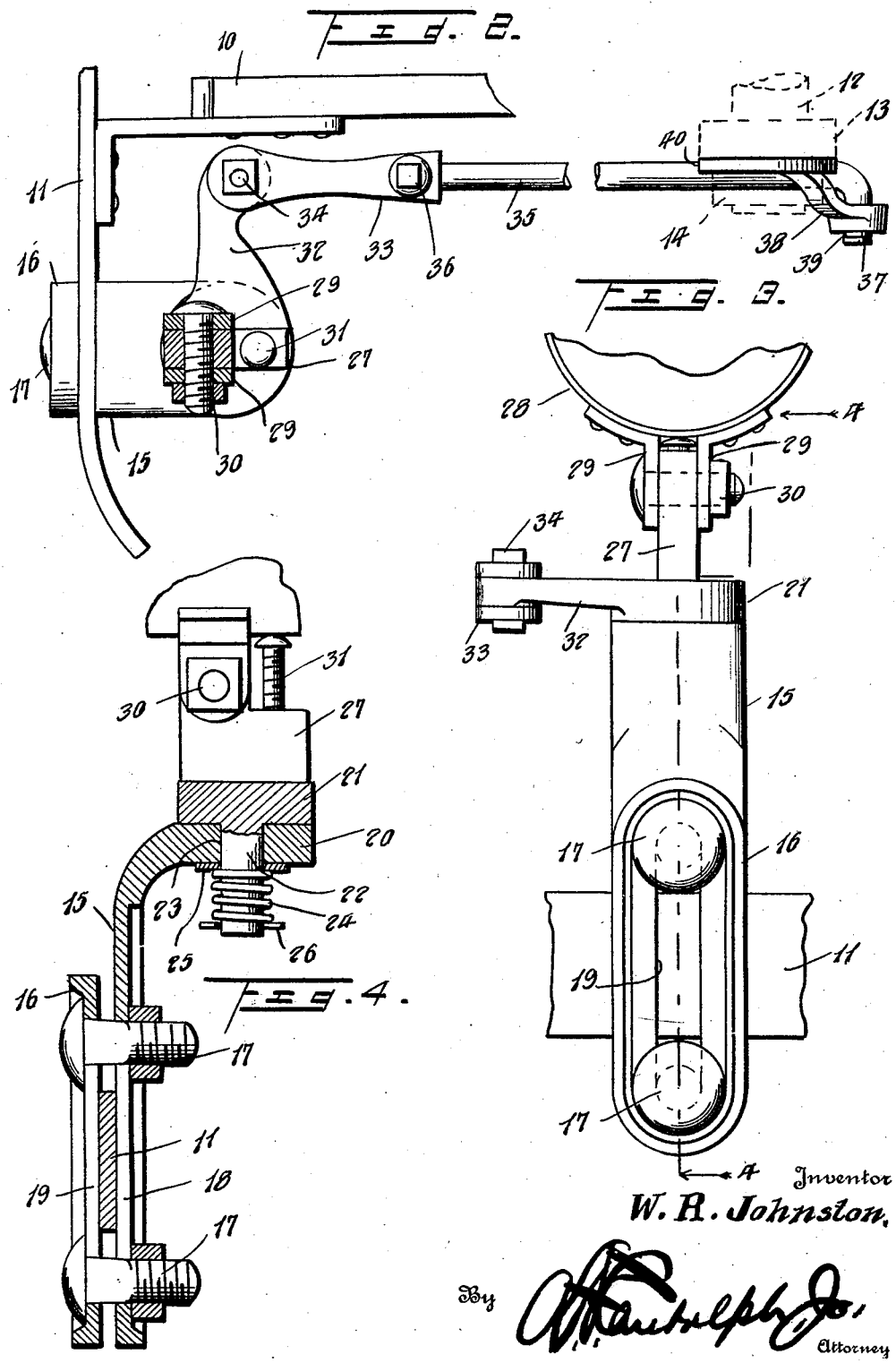
Inventor
W. R. Johnston.
By
Attorney Patented Mar. 5, 1929.

1,704,615

UNITED STATES PATENT OFFICE.

WILLIAM R. JOHNSTON, OF LOS ANGELES, CALIFORNIA, ASSIGNOR OF ONE-HALF TO ANTON TELICH, OF LOS ANGELES, CALIFORNIA.

AUTOMATIC HEADLIGHT MECHANISM.

Application filed April 12, 1928. Serial No. 269,544.

This invention relates to a mechanism adapted to automatically turn headlights according to the path of travel of an automobile so that their action will be dirigible.

A particular object of the present invention is to provide a novel construction which may constitute an attachment for existing automobiles and accommodate the headlights with which they are equipped.

Another object is to provide an exceedingly simple and efficient construction and one which may primarily be mounted on the front bumper of the automobile and be actuated through the steering mechanism, and a construction which at the same time is capable of adjustment at various locations so as to properly position and focus the headlights particularly to conform to the various traffic laws.

Additional objects and advantages will become apparent from a consideration of the description following taken in connection with accompanying drawings illustrating an operative embodiment.

In said drawings:—

Figure 1 is a fragmentary elevation of an automobile equipped with my improvement;

Figure 2 is a view taken on the plane of line 2—2 of Figure 1, substantially, and primarily through my improvement;

Figure 3 is an enlarged front elevation of my improvement or attachment, and

Figure 4 is a sectional view taken on the line 4—4 of Figure 3.

Referring specifically to the drawings, an automobile is fragmentarily shown at 10 which is equipped with a front bumper at 11 and which is equipped with the usual rock shaft 12 operated by the steering gear and from which the steering rod 13 depends, is rigidly connected and is operated, being held in place by a nut 14 on the rod 12.

In carrying out my invention, a bracket 15 is provided in coaction with a clamping plate at 16. Said bracket 15 and plate 16 are adapted to engage opposite sides of the bumper 11 and be secured thereto by means of usual bolts 17 adjustably accommodated through vertically elongated slots 18 and 19 in said bracket and plate respectively. The bracket 15 has an integral, horizontal, rearwardly extending crown 20 which is surmounted by a lamp or headlight support 21. Said support 21 is rockably mounted and has a stud 22 depending therefrom and journaled in an opening 23 in the crown 20.

The stud 22 is removably fastened in place and the crown 20 and support 21 are in frictional contact through the action of an expansive coil spring 24 surrounding the stud 22, engaging a washer 25 or crown 20 at one end and a pin 26 at the other end, which extends removably through an opening diametrically of the stud 22.

The lamp support 21 has a vertically extending lug 27 to which a headlight 28 is removably and adjustably fastened. Such headlight may be one of those with which the vehicle is originally equipped and it has spaced clips 29 to engage opposite sides of the lug 27. Through alined openings of the clips 29 and lug 27, a removable bolt 30 is passed. In order to provide for the proper elevation and focusing of the headlight 28, a screw 31 engages the same in the rear of the lug 27 and which screw is adjustably threaded in an opening in the lug 27.

Extending laterally from the lamp support 21 is a crank arm 32 to which a link 33 is pivotally connected as by a removable bolt 34. A connecting rod 35 extends adjustably into the link 33 and is fastened adjustably thereto as by means of a bolt 36 binding against the same.

At the rear end, rod 35 has a lateral extremity 37 which is journaled in a crank arm 38, and held against accidental displacement by a cotter key 39 passed through said extremity 37. The crank arm 38 is adapted to be connected to the shaft 12 rigidly so as to rock therewith and in attaching the device, the nut 14 may be removed so that the ring or eyelet 40 of the crank 38 may be applied to the shaft 12 after which the nut 14 is positioned and used to bind the eyelet 40 against the steering rod 13.

As a result of the construction described, the steering of the automobile will rock the shaft 12 and thus impart rocking movement to the crank 38, rod 35, link 33, arm 32 and the lamp support 21 and the lamp. The lamp may be properly adjusted as to position and focus particularly through adjustment of screw 31 and the bolt 36 and incidental relative positioning of rod 35 and link 33.

Changes may be resorted to provided they fall within the spirit and scope of the invention.

I claim as my invention:—

In a structure of the class described, a vertically extending bracket having a horizontally extended crown, means to connect the bracket to a bumper or the like, a lamp support having a stud rotatably mounted in the crown, an expansive spring to maintain the support and crown in frictional engagement, means on the support for attachment of a lamp thereto, a crank extending from the support, a link pivotally connected to the crank, and means to connect the link to the steering gear of a motor vehicle for dirigible operation of the lamp.

In testimony whereof I affix my signature.

WILLIAM R. JOHNSTON.